Sept. 7, 1937.  A. SMITH  2,092,657
ROTARY KILN CONTROL ARRANGEMENT
Filed Dec. 12, 1934
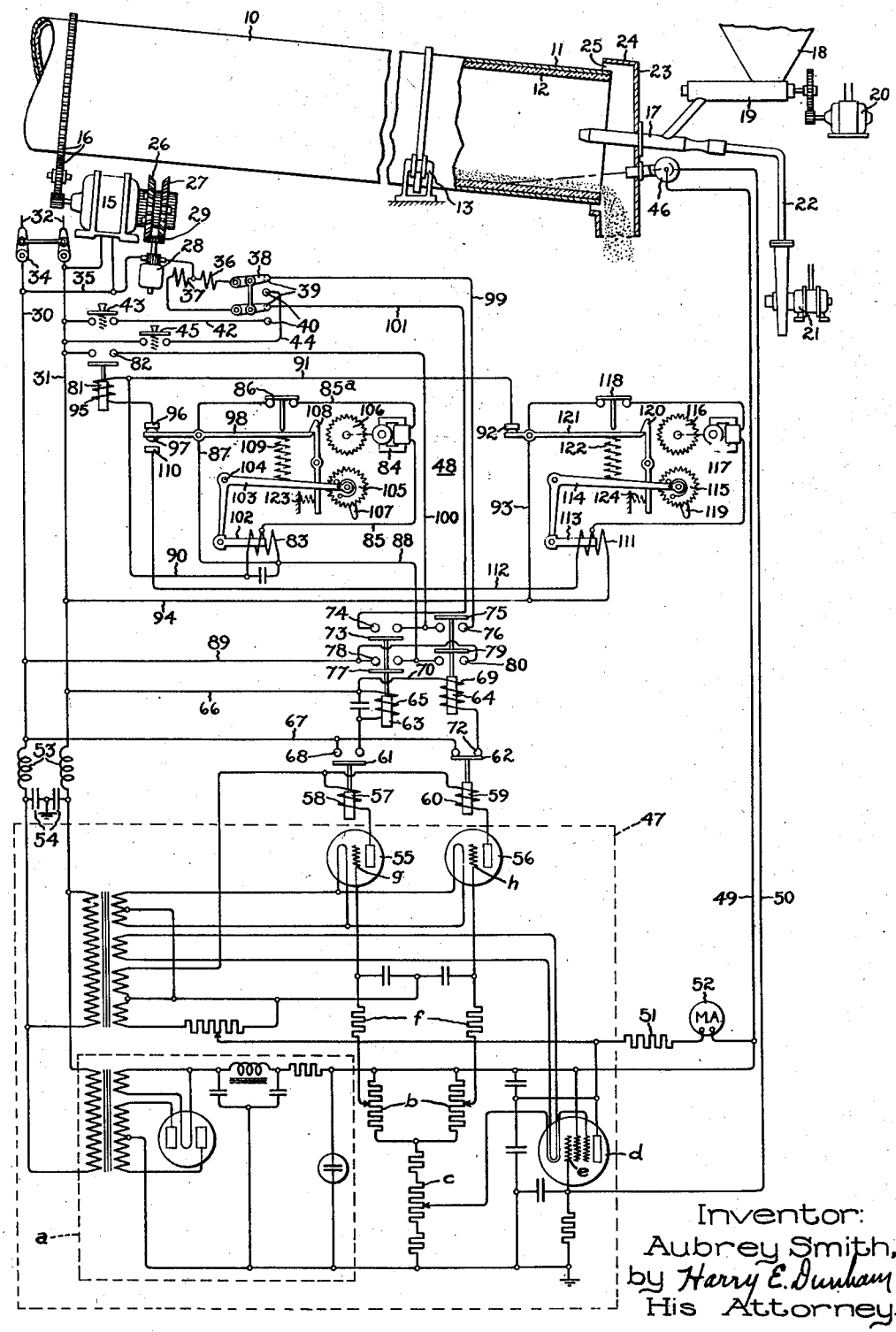
Inventor:
Aubrey Smith,
by Harry E. Dunham
His Attorney.

Patented Sept. 7, 1937

2,092,657

UNITED STATES PATENT OFFICE 2,092,657

ROTARY KILN CONTROL ARRANGEMENT

Aubrey Smith, Schenectady, N. Y., assignor to General Electric Company, a corporation of New York Application December 12, 1934, Serial No. 757,168

3 Claims. (Cl. 263—33)

The present invention relates to rotary kiln control arrangements, more specifically to the kind of control arrangements used for controlling rotary kilns in cement manufacturing plants, although it is not limited thereto necessarily.

In the present day cement manufacturing plants, inclined rotary kilns of considerable length are provided to effect incipient vitrification or fusion of two materials, one material rich in lime, such as limestone or marl, known as calcareous material, and another material rich in silica, alumina and iron oxide, such as clay or shale, known as argillaceous material. A homogeneous mixture of these two materials is fed into the high end of a rotary kiln and during rotation of the latter passes through the different zones thereof, known as dehydration zone, calcining zone, and clinkering zone. At the end of the last zone, the cement clinker is discharged and cooled. The union of the materials within the kiln is effected by the application of heat which in the usual arrangement is produced by a burner projecting into the lower end of the kiln and discharging combustible material therein. The final temperature at which incipient fusion or union takes place is of the order of 1500° centigrade. It is desirable to maintain substantially constant temperature within the kiln because a considerable variation of the temperature lowers the quality of the produced cement clinker and also the efficiency of the kiln.

The object of my invention is to provide an improved construction and arrangement of rotary kiln appurtenances especially an improved control mechanism for such equipments whereby the quality of the clinker is improved and the output and thermal efficiency of the kiln increased.

For a consideration of what I believe to be novel and my invention, attention is directed to the following description and the claims appended thereto in connection with the accompanying drawing.

The single figure of the drawing shows diagrammatically a kiln control arrangement in accordance with my invention, particularly adapted for the manufacture of cement.

The arrangement comprises an inclined rotary kiln 10 which has a sheet steel cylinder 11, lined inside with refractory brick, or like heat resistant material 12. The cylinder 11 is rotatably supported on suitable bearings 13 and driven by a motor 15 through a gearing 16. Fuel is conducted into the interior of the lower end of the kiln by a burner 17 receiving fuel from a bin 18 through a feed screw 19 driven by a motor 20.

The fuel is forced out of the burner into the kiln by vehicle air which is supplied by a motor compressor 21 having a discharge conduit 22 connected to the burner 17. The burner 17 is supported on or near an end plate 23 of the kiln. The end plate 23 is secured to a cylindrical member 24 concentrically surrounding the end of the kiln and forming an annular space 25 therewith through which secondary air is drawn into the kiln during operation to maintain combustion. During normal operation an amount of fuel and primary air, depending upon the output of the kiln, is supplied at considerable velocity through the burner 17, causing a substantially definite amount of air to be drawn into the kiln, which amount of air varies slightly in accordance with atmospheric conditions. As stated above, the quality of the cement or like substance thus produced varies considerably with changing temperature in the kiln.

In accordance with my invention, I provide an improved regulating arrangement for the kiln for automatically and manually maintaining substantially constant final temperature of the clinker in the kiln. This is accomplished by controlling the speed of the kiln in response to changes in temperature therein. To this end the motor 15 for driving the kiln is an adjustable speed motor. In the present instance I have shown an A. C. commutator motor with two sets of brushes 26 and 27 which may be adjusted, that is rotated relatively to each other in either direction by means of a pilot motor 28 connected to the two sets of brushes by a gearing 29. The motor 15 and the pilot motor 28 are connected to lines or conductors 30 and 31, which latter receive energy from a suitable source of A. C. current 32 through a switch 34. The pilot motor 28 is a reversible motor with one terminal thereof connected to the line 30 by a conductor or wire 35 and two fields 36 and 37 connected to a double-throw switch 38 for connecting the fields with two sets of contacts 39 and 40 respectively. One of the contacts 40 is connected to the line 31 by a wire 42 including a push-button 43, and the other contact 40 is connected to the line 31 through a wire 44 and a push-button 45. When the switch 38 is connected with the contacts 40, the pilot motor 28 may be operated manually in either direction by closing push-buttons 43 and 45 respectively. Closing of one of the push-buttons, for instance 43, causes operation of the pilot motor 28 in one direction, resulting in an increase in speed of the variable speed motor 15, and closing of the other push-button 45 causes operation of the pilot motor 28 in the opposite direction, resulting in a decrease in speed of the variable speed motor 15.

During operation, the speed of the kiln is increased in response to increasing temperature in the clinkering zone, and vice versa, the speed of the kiln is decreased in case the temperature in the clinkering zone decreases. With this arrangement, substantially constant final maximum temperature of the clinkered material is maintained, thereby producing higher quality clinker at improved thermal efficiency of the kiln.

In accordance with my invention, I provide means for automatically controlling the speed of the kiln in response to temperature changes therein. These means effect automatic operation of the pilot motor 28 whenever the double-throw switch 38 connected to the fields 36 and 37 of the pilot motor engages the contacts 39, as indicated in the drawing.

The means for automatically operating the pilot motor 28 in response to temperature changes in the kiln comprises a temperature responsive device, preferably a photoelectric cell 46, an amplifier 47, and a time delay relay or contact making and breaking device 48. The provision of a time delay relay is of particular significance in my arrangement in that it permits operation of the motor 28 for a predetermined time only. Thereafter the operation of the pilot motor 28 is interrupted for another predetermined time. Thus, from another viewpoint, the time delay relay or contact making and breaking device 48 causes intermittent operation of the pilot motor 28, thereby preventing over-travel of the kiln speed changing devices and consequent hunting of various elements of the operating mechanism. The photoelectric cell 46 is connected to the amplifier 47 by wires 49 and 50 including a resistor 51 and a milliammeter 52. The amplifier 47 is connected to the lines 30 and 31 through reactors 53 grounded by capacitors 54. Various kinds of amplifiers may be used. The amplifier, in the present instance includes a rectifier and a wave smoothing filter "a" for supplying a substantially constant D. C. voltage to voltage dividers b and c, respectively. The latter are connected in known manner to a thermionic vacuum valve d having a grid e connected through a wire 50 to the photoelectric cell 46 whereby the grid potential varies in accordance with temperature changes in the kiln. The voltage dividers b are connected through common grid resistors f to the grids g and h of two discharge valves or tubes 55 and 56, respectively, whereby the latter are controlled in response to temperature changes in the kiln. The arrangement is such that during normal conditions one of the discharge valves 55 or 56, in the present instance the valve 55, is non-conducting and the valve 56 is conducting. Further details of the present amplifier are not described because they do not form a part of my invention.

An electromagnetic relay 57 has an operating coil 58 connected to the anode of the discharge tube 55 and another relay 59 has an operating coil 60 connected to the discharge tube 56. The two relays 57 and 59 have contact making members 61 and 62 respectively which serve for controlling the circuits of two relays 63 and 64 respectively. The relay 63 has an operating coil 65 connected to the line 31 by a wire 66 and to the line 30 by a wire 67 including two contacts 68 adjacent the contact making member 61. The relay 64 has an operating coil 69 connected through a wire 70 and the aforementioned wire 66 to the line 31 and through a pair of contacts 72 adjacent the contact making member 62 to the wire 67.

As pointed out above, the discharge tube 56 is normally conducting. Therefore, the operating coil 60 of the relay 59 is normally energized and the contacts 72 of the circuit for the relay 64 are normally closed by the contact making member 62. The relay 63 has a contact making member 73 for closing a pair of contacts 74 in the circuit of the field winding 37 of the pilot motor 28 and the relay 64 has a contact making member 75 for bridging contacts 76 in the circuit of field winding 36 of the pilot motor 28. In addition, the relay 63 has another contact making member 77 for closing a pair of contacts 78 in the circuit of the time delay relay 48, and the relay 64 has also another contact making member 79 for closing a pair of contacts 80 in the circuit of the time delay relay 48. The arrangement is such that with the coil 69 of the relay 64 energized, the contacts controlled by said relay are opened and with the coil 65 of the relay 63 deenergized the contacts controlled by this relay are also opened, as shown in the drawing.

The time delay relay 48 forms the subject matter of an application of Goff, Serial No. 748,839, filed October 18, 1934, and therefore is described briefly only. It comprises an intermittently operated relay 81 for intermittently opening and closing a pair of contacts 82, a solenoid 83, and a small self-excited synchronous motor 84. The circuit for the motor 84 includes a wire 85 connected to an intermediate point of the solenoid coil 83 and a wire 85a including a contact making member 86 and a wire 87 connected to an end terminal of the solenoid coil 83. This end terminal of the solenoid coil is connected by a wire 88 to the contacts 78 and 80 which in turn are connected by a wire or conductor 89 to the line 30. The other terminal of the solenoid coil 83 is connected by a wire 90, a wire 91, contacts 92, a wire 93, and a wire 94 to the line 31. Thus the solenoid coil 83 is energized when one of the relays 63 or 64 is closed. With the time delay relay mechanism in the position indicated in the drawing, energization of the solenoid coil 83 also causes energization of the synchronous motor 84, through the circuit described above, and of a coil 95 for the relay 81. The coil 95 has one terminal connected to the wire 91 and another terminal connected through a contact 96, another contact 97, a lever 98, and the aforementioned wire 87 to one terminal of the solenoid coil 83. Energization of the coil 95 effects closing of the contacts 82 by the relay 81. This causes energization of one of the fields of the pilot motor. For instance, with the contactor 81 and the relay 64 closed, the field coil 36 is connected to the line 31 through a wire 99, the contacts 76, a wire 100, and the contacts 82. In case the relay 63 is closed, the pilot motor is operated in the opposite direction, the field winding 37 then being connected to the line 31 through a wire 101, the contacts 74, the wire 100 and the contacts 82.

As stated above, the relay 81 is automatically energized and deenergized, that is, it operates intermittently, causing intermittent operation of the pilot motor 28. Opening and closing of contacts 82 is effected by the time delay relay whose solenoid 83 when energized pulls a plunger 102 to the right, causing counterclockwise turning movement of the bell crank lever 103 about a fulcrum 104. A timing gear 105 connected to the bell crank lever is thereby turned upward and brought into engagement with a gear 106 driven by the synchronous motor 84. The timing gear has a calibrating disc with a pointer 107 for adjusting the desired time delay. Rotation of the timing gear 105 by the gear 106 causes rotation of the pointer 107 and after a predetermined time this pointer 107 unlatches a latch 108 engaging the lever 98. This causes turning movement of the lever 98 by the action of a compressed spring 109 resulting in opening movement of the contact making member 86, thereby deenergizing the synchronous motor 84, and simultaneously an opening movement of the relay 81. The contact 97 of the lever 98 then engages another contact 110 and thereby effects closing of the circuit of another solenoid coil 111. One end of the latter coil 111 is connected through the wire 94 to the line 31, and the other end is connected through a wire 112, the contacts 110 and 97, the lever 98, the wire 87, the wire 88, and the contacts 78 or 80, and the wire 89, to the line 30. Energization of the solenoid 111 causes a plunger 113 in cooperative relation with the solenoid coil to be moved toward the right whereby a bell crank lever 114 similar to the lever 103 is turned and effects engagement between another timing gear 115 and a gear 116 driven by another small synchronous motor 117. The synchronous motor 117 then is energized, being connected similarly to the connection of the synchronous motor 84 between a terminal and a mid-tap of the solenoid 111. Its circuit includes a contact making member 118 corresponding to the member 86. The gear 115 when in engagement with the gear 116 causes rotation of a pointer 119 adjustably secured to the gear 115 until the pointer 119 engages a latch 120 and effects unlatching of a lever 121 whereby the lever 121 is turned by the action of a spring 122 and effects opening of the contactor 118, thus interrupting the circuit for the synchronous motor 117. Turning of the lever 121 also effects opening of the contacts 92 whereby the solenoid 83 is deenergized. Deenergization of the solenoid 83, however, causes resetting of the mechanism. The lever 103 with the gear 105 are moved out of engagement with the gear 106 by gravity. That is, the gear 105 drops and permits relatching between the lever 98 and the lever 108 by the action of a spring 123 engaging the lower end of the latch 108. When this occurs, the spring 109 is compressed by the weight of the lever 98. Turning movement of the lever 98 in turn opens the circuit for the solenoid 111, whereby the gear 115 is disengaged from the gear 116. The lever 121 then drops by gravity, effecting reengagement with the latch 120 by action of a spring 124 and also effecting closing of the contacts 92 and compression of the spring 122. If by this time one of the relays 63 or 64 is still closed, another cycle of operation of the time delay relay begins similar to the one described above.

The operation of the mechanism as a whole is briefly as follows. The electronic discharge valve or tube 55, which in substance is a relay energized in response to temperature changes, is normally non-conducting and the tube 56 is normally conducting; hence the relay 57 is normally open and the relay 59 is normally closed. Both relays 63 and 64 are normally open. A change in temperature causes the tube 55 to become conducting or the tube 56 to become non-conducting, depending upon whether the temperature increases or decreases. Such changes effect in one case opening of the relay 62 and in the other case closing of the relay 61, resulting in closing of one of the relays 63 or 64. These relays effect operation of the time delay relay or device 48 which intermittently energizes and deenergizes the coil 95 of the contactor 81, and thereby effects intermittent closing and opening of one of the field circuits of the pilot motor 28. Thus, the pilot motor whose circuits in addition to the contacts 82 also include one of a pair of contacts 74 or 76 is intermittently operated and effects an intermittent increase or decrease in speed of the variable speed motor 15, depending upon whether the temperature of the kiln rises or drops. This operation is continued until normal temperature in the kiln is reestablished during which conditions the gas filled, grid controlled discharge valve 55 is non-conducting and the other valve 56 is conducting.

With my invention I have accomplished an improved control mechanism for rotary kilns whereby the speed of these kilns may be automatically and manually controlled in response to temperature changes of a substance heated in the kilns. The arrangement is relatively simple. It includes a photoelectric cell, a standard time delay relay and a standard amplifying means. The control arrangement is reliable and effective in operation. During operation, the temperature in the kiln is maintained substantially constant, whereby in many cases, especially where clinker is produced, the products discharged by the kiln are of uniform high quality.

In accordance with the provisions of the patent statutes, I have described the principle of operation of my invention, together with the apparatus which I now consider to represent the best embodiment thereof, but I wish it understood that the apparatus shown and described is only illustrative and that the invention may be carried out by other means.

What I claim as new and desire to secure by Letters Patent of the United States is:

1. The combination of a rotary kiln for heating a substance, a variable speed motor for driving the kiln, means for conducting fuel and air to the kiln to maintain combustion therein, and means for automatically intermittently increasing the speed of the motor in response to increasing temperature in the kiln and intermittently decreasing the speed in response to decreasing temperature.

2. The combination of a rotary kiln for heating a substance, a variable speed motor for driving the kiln, means for conducting fuel and air to the kiln to maintain combustion therein, and means for intermittently increasing the speed of the motor in response to increasing temperature in the kiln and intermittently decreasing the speed in response to decreasing temperature, said means including a pilot motor for controlling the variable speed motor, a photoelectric cell trained onto the substance in the kiln, relay means and a contact making and breaking device for controlling the pilot motor, and means connected between the photoelectric cell and the relay means for operating the relay means in response to temperature changes.

3. The combination of a rotary kiln for heating a substance, a variable speed motor for driving the kiln, means for conducting fuel and air to the kiln to maintain combustion therein, and means for automatically intermittently increasing the speed of the motor in response to increasing temperature in the kiln and intermittently decreasing the speed in response to decreasing temperature, said means including a temperature responsive device associated with the kiln, an electric circuit including a contact making and breaking element for the motor, a time delay relay actuated in response to temperature changes in the kiln and an auxiliary electric circuit between the time delay relay and the contact making and breaking device.

AUBREY SMITH.